Figure 1:
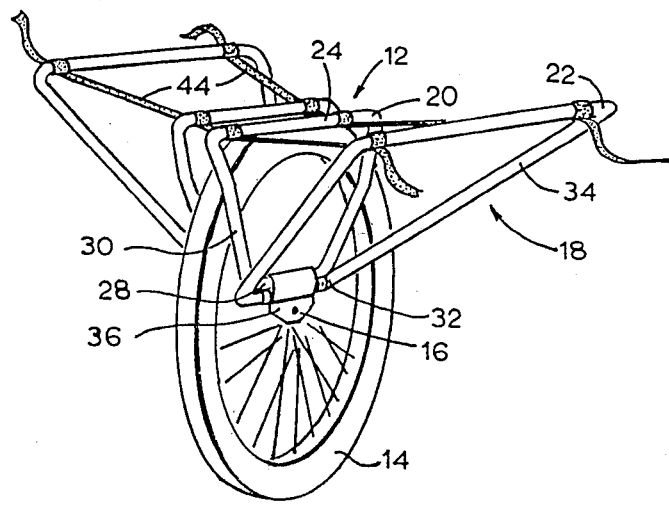

United States Patent [19]

Margison

[11] 4,440,409

[45] Apr. 3, 1984

[54] BOAT TRANSPORTER

[76] Inventor: Alan B. Margison, 54 Amelia, Elmvale, Ontario, Canada, L0L 1P0

[21] Appl. No.: 282,489

[22] Filed: Jul. 13, 1981

[51] Int. Cl.³ .............................................. B62B 1/10
[52] U.S. Cl. ........................... 280/47.13 B; 280/47.32
[58] Field of Search ................. 280/47.13 R, 47.13 B, 280/47.32, 47.3, 652, 42; 403/85, 113, 117; 135/1 A, 3 A, 4 A, 7, DIG. 1, DIG. 12; 108/118; 248/164, 166, 434

[56] References Cited

U.S. PATENT DOCUMENTS

| 704,426 | 7/1902 | Allen | 280/47.3 |
|---|---|---|---|
| 2,429,028 | 10/1947 | Neeley | 280/47.3 |
| 2,636,748 | 4/1953 | Giovannoni | 280/47.37 R |
| 2,987,109 | 6/1961 | Sohmer | 108/118 |
| 3,860,254 | 1/1975 | Wegener | 280/652 |

FOREIGN PATENT DOCUMENTS

| 2640236 | 3/1978 | Fed. Rep. of Germany ... 280/47.13 B |
|---|---|---|
| 528039 | 12/1921 | France ................................ 248/164 |

Primary Examiner—Joseph F. Peters, Jr.
Assistant Examiner—Timothy Roesch
Attorney, Agent, or Firm—Hirons, Rogers & Scott

[57] ABSTRACT

A boat transporter has a single wheel rotatably supported in a cradle. The cradle is formed from a pair of frames which are spaced on opposite sides of the wheel. The boat is supported on the cradle and held by a strap. The boat which projects on either side of the cradle may then be rolled across a portage. To facilitate storage, the cradle is collapsible.

7 Claims, 13 Drawing Figures

U.S. Patent  Apr. 3, 1984  Sheet 1 of 4  4,440,409

U.S. Patent  Apr. 3, 1984  Sheet 3 of 4  4,440,409

BOAT TRANSPORTER

The present invention relates to a transporter for a boat or similar device to enable the boat to be easily moved over land.

Boats and in particular canoes are widely used to gain access to remote areas where the only practical form of transportation is by water. Transportation in this manner necessarily requires occasional portages either between adjacent lakes or around hazardous water. These portages are usually accomplished by emptying the canoe, carrying the canoe over the portage and then returning to carry the contents of the canoe. Such portaging detracts from the enjoyment of the use of the canoe where it is used for recreation purposes and reduces the efficiency of this mode of transportation when it is used for commercial purposes. Recent developments in canoe design have attempted to make the canoe lighter, usually by the use of sophisticated materials within the canoe, but this has also increased the price of such canoes.

It is therefore an object of the present invention to provide a transporter for use with a boat or similar device which facilitates portaging of the canoe and its contents.

According therefore to the present invention there is provided a transporter for a boat or similar device comprising a cradle having a pair of laterally spaced support frames each of which includes a longitudinally extending member to support said boat, an axle extending between said support frames at a location spaced from said longitudinally extending member and a wheel rotatably supported on said axle whereby upon placement of a boat upon said cradle said wheel supports said boat and permits movement thereof.

Figure 4:
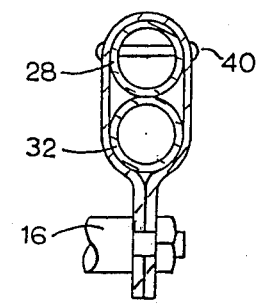
Figure 3:
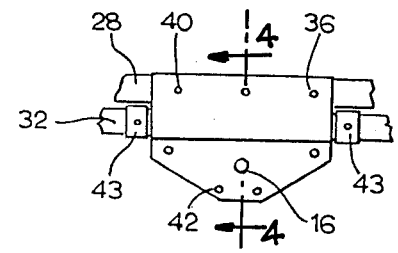
Figure 2:
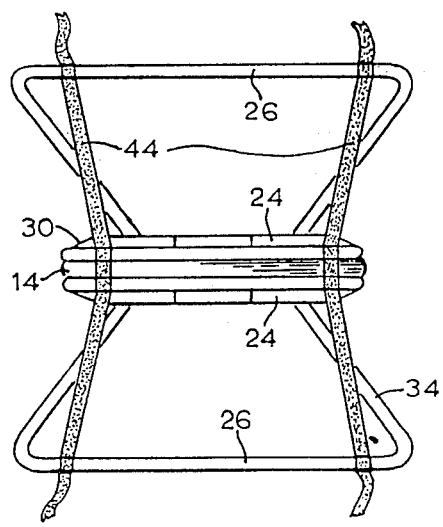
Figure 5:
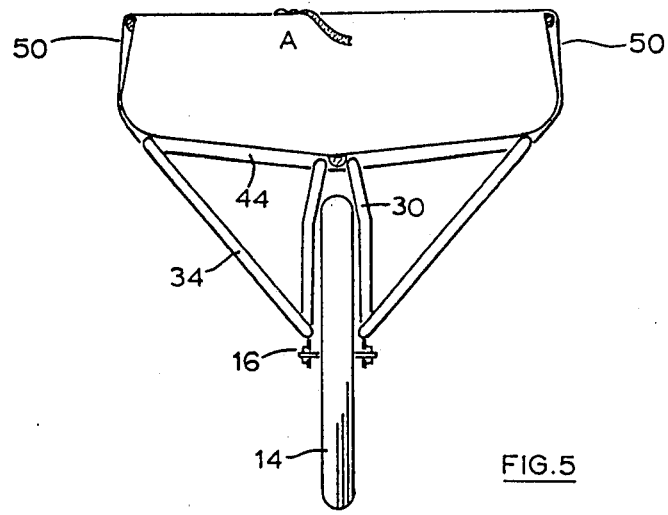
Figure 6:
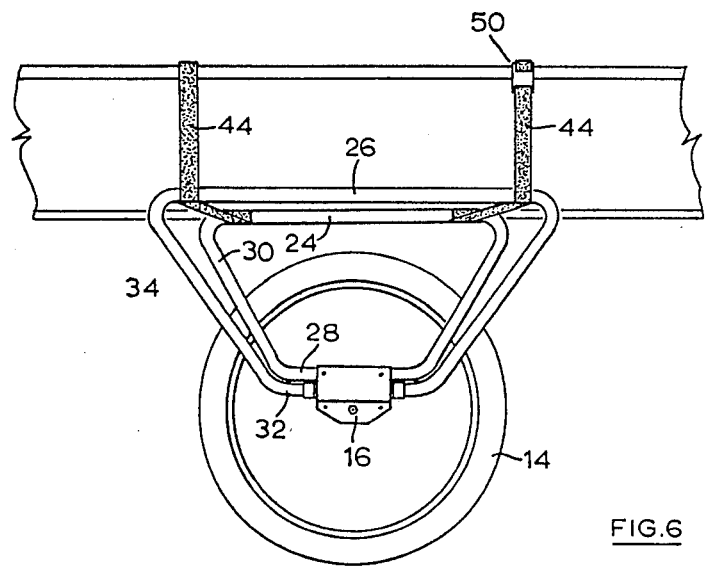
Figure 7:
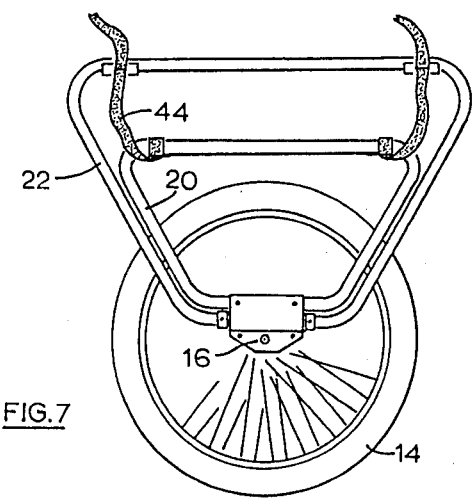
Figure 11:
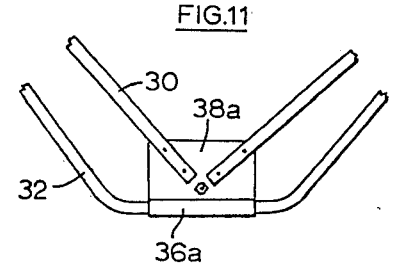
Figure 8:
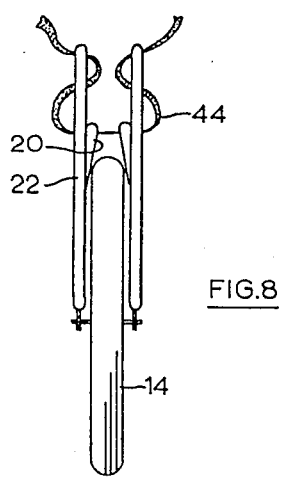
Figure 9:
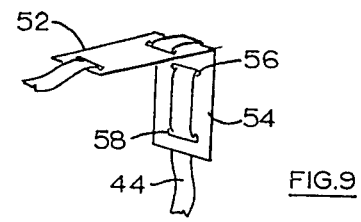
Figure 10:
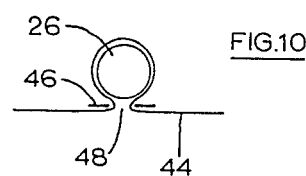
Figure 12:
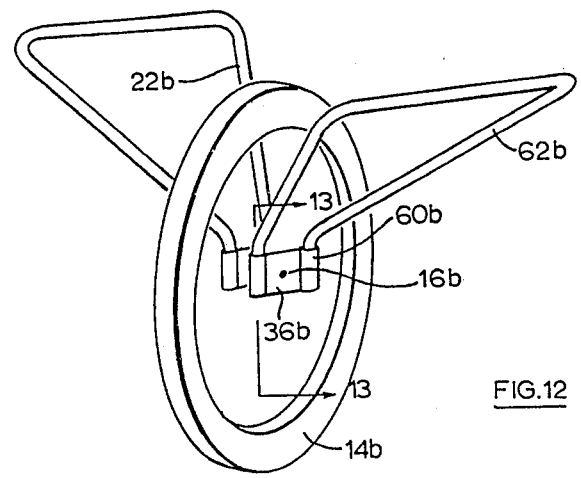
Figure 13:
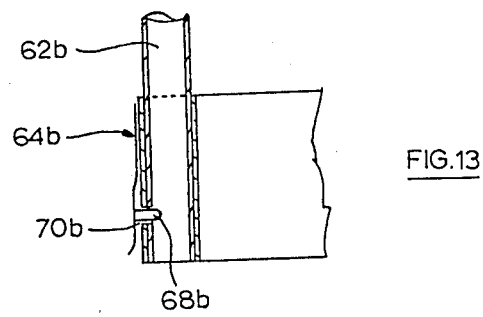

Embodiments of the invention will now be described by way of example only with reference to the accompanyingg drawings in which:

FIG. 1 is a perspective view of a transporter in an operative position but without a boat, FIG. 2 is a plan view of the transporter shown in FIG. 1, FIG. 3 is a detailed view showing a portion of the transporter shown in FIG. 1, FIG. 4 is a view on the line 4—4 of FIG. 3, FIG. 5 is an end elevation of the transporter shown in FIG. 1 showing a canoe supported on the transporter, FIG. 6 is a side elevation of the canoe and transporter shown in FIG. 5, FIG. 7 is a side elevation of the transporter of FIG. 1 showing the transporter in a collapsed position, FIG. 8 is an end view of the transporter shown in FIG. 7, FIG. 9 is a perspective view of a portion of the strap used to hold the boat in position on the transporter, FIG. 10 is a section on the line 10—10 of FIG. 7, FIG. 11 shows an alternate arrangement of the frame member shown in the views of FIGS. 1 to 10, FIG. 12 shows an alternative embodiment of transporter, FIG. 13 is a view on the line 13—13 of FIG. 12.

Referring now to FIG. 1, a transporter 10 comprises a cradle generally designated 12 supported on a wheel 14 rotatably connected to the cradle by means of an axle 16. The cradle 12 comprises a pair of support frames 18 each of which has an inner frame member 20 and an outer frame member 22. Each of the frame members 20,22 are generally trapezoidal in shape and the longer of the parallel sides 24,26 respectively extend longitudinally of the transporter. The side 24 of frame 20 is connected to the other parallel side 28 by means of interconnecting portions 30. The interconnecting portions 30 are angled between the sides 24,28 so that the sides 24 are closer to one another than the sides 28.

Similarly the shorter parallel side 32 of frame member 22 is connected to the side 26 by straight connecting portions 34.

As may best be seen in FIG. 3, the sides 28 and 32 are pivotably interconnected by a bracket 36. The bracket 36 is formed from a web of material which is bent around the sides 28,32 with its terminal portions pinched together to form a depending flange 38. The bracket 36 is secured to the side 28 by means of rivets 40. The terminal portions of the web are also secured by means of rivets 42 so that the side 32 is snuggly received between the side 32 and the flange 38. The frame 22 may therefore pivot relative to the frame 20 and collars 43 are provided on the side 32 at opposite ends of the bracket 36 to prevent longitudinal movement of the frame 22 within the bracket.

The flange 38 is drilled to receive the end of the axle 16 to hold the support frames 18 in position on opposite sides of the wheel 14.

A pair of flexible straps 44 are secured at spaced locations to each of the sides 24 of frame 20. The straps 44 therefore extend between adjacent sides 24 and are secured to them to inhibit relative movement between the frame members 20. Each strap 44 is also secured to the side 26 at spaced locations and extends beyond the side to provide a fastening strap to secure the boat on the transporter. The manner in which the strap 44 is attached to the side 26 may best be seen in FIG. 10. A plate 46 with an elongate slot 48 is riveted to the underside of the side 26. The plate 46 is spaced slightly from the side 26 and the width of the slot is sufficient to accommodate two thicknesses of the strap 44. The strap 44 is fed from beneath the plate 46 through the slot 48 and around the circumference of the side 26. The strap 44 is then fed back through the slot 48. With the strap 44 pulled tight and extending generally tangental to the side 26, the strap is securely held by impingement on the edges of the plate 48. The strap 44 therefore acts as a stop to limit pivot or movement of the frame 22. The distance between the frames 20 and 22 may be adjusted by releasing tension from the strap 44 and feeding it through the slots 48 and around the circumference of the side 26. As soon as tension is reapplied to the strap the strap 44 and plate 48 cooperate to prevent further movement between the strap and the frame 22.

Similar brackets are also used to secure the strap 44 to the sides 24.

To assist in holding the boat in its desired position on the transporter 10 each strap is provided with a pair of angle brackets 50 shown in FIG. 9. The bracket has a pair of legs 52,54 each of which has a pair of spaced transverse slots 56,58. The strap 44 is fed through the slot 58 to the interior surface of the angle bracket 50. It then passes through the slot 56 to extend around the angle of the bracket 50 and back through the slot 56 to the interior surface of the bracket. The strap then emerges through the slot 58 in the leg 52. The position of the bracket 50 on the strap 44 may be adjusted by threading the strap 44 through the slots 56, 58. However, upon tension being applied to the strap, the bracket is firmly positioned and enables the load exerted on the canoe by the strap 44 to be spread over a larger area. Further by positioning the strap on the interior surface between the slots 56,58 it is possible to provide a relatively soft abutment between the bracket 50 and the canoe frame and therefore reduce the risl of undesirable abrasions.

The frames 20,22 are conveniently bent from aluminum tubing to reduce the weight of the transporter to a minimum.

The transporter 12 may be stored in a canoe in the position shown in FIGS. 7 and 8. In this position the frame 22 is pivoted so that it lies in the same plane as the frame 20. The frames 20,22 are dimensioned so that they may be nested in this fashion to facilitate storage of the transporter in a minimum of space within the canoe. Upon reaching a portage, the transporter is removed from the canoe and the frame 22 pivoted so that it is in the open position shown in FIG. 1 with the straps 44 taut between the frames 20,22. The straps 44 are adjusted so that the sides 26 are in the correct position to support the particular canoe with which the transporter is being used. The canoe may then be lifted onto the transporter so that the keel strip of the canoe sits between the sides 24 frame 20. As the strap 44 is tangental to the lowest point of the sides 26, it does not interfere with the placement of the keel strip of the canoe. The sides 26 abut the canoe at spaced locations across its bottom to provide stable support for the canoe. The strap 44 is then passed around the sides of the canoe and across the top with the brackets 50 being positioned at the upper edge of the side walls of the canoe. A buckle is provided at one end of the strap 44 to enable the ends of the strap to be fastened and hold the canoe in place on the cradle 12. With the canoe positioned in this manner, the occupants of the canoe can push the canoe over the portage by holding the opposite ends of the canoe. The wheel 14 of course supports the weight of the canoe and the steering of the wheel 14 is achieved through the canoe itself. The single wheel enables the transporter to be readily steered and also to be used on the narrow paths normally associated with portages.

At the end of the portage, it is simply necessary to undo the strap 44, remove the canoe from the transporter and collapse the transporter into the position shown in FIG. 7. Portaging of the canoe can therefore be achieved without carrying the canoe and without unloading the canoe. The transporter is comparatively light, can be stored in a convenient location within the canoe and is also adaptable to different sizes of the canoe.

An alternative arrangement of securing the frames 20,22 is shown in FIG. 11. In this case, the frame 20 is generally triangular in shape and the legs 30 are directly secured to a flange 38a of a bracket 36a. The frame member 26 is pivotally secured to the bracket 36a in the manner described above.

An alternative embodiment of the transporter is shown in FIGS. 12 and 13 and is of somewhat simpler construction. Similar reference numerals will be used for similar parts with the suffix b added for clarity of description.

The cradle 12b is formed from a pair of frames 22b, which are detachably secured to a bracket 36b. The axle 16b passes through the bracket and rotatably supports the wheel 14b. Each of the brackets 36b is formed with a pair of sockets 60b which are spaced on opposite sides of the axle 16b and extend generally vertically. The frame member 22 is generally triangular with longitudinally extending base 26b and converging legs 62b. The terminal portions of the legs 62b are angled out of the plane of the frame 22b and extend parallel to one another at the spacing of the socket 60b. The terminal portions of the legs 62b may therefore be engaged with the sockets 60b to secure the frame 22b to the bracket 36b.

A detent mechanism 64b is provided to hold the frame in position. The detent comprises a leaf spring with a projecting slug 68b which passes through a hole 70b in the socket 60b. A complimentary hole is formed in the terminal portion of the leg 62b so that upon placement of the frame into the socket, the slug engages a hole to hold the frame into position.

When transporting the transporter 12b, the frames 22b are removed and may be stored alongside the wheel 14b in a reverse position. To use the transporter 12b, it is simply necessary to attach the frames 22b within the socket 60b with the frames diverging to provide a stable base for the canoe. Suitable straps can be provided between the two frames to hold the frames together and encompass the canoe in the manner described above.

It will be seen therefore that a lightweight and compact transporter has been provided for a boat or similar device which enables portaging to be accomplished without physically carrying the boat and without necessarily emptying the contents from the boat.

We claim:

1. A transporter for a boat or similar device comprising a cradle having a pair of laterally spaced support frames each of which includes a longitudinally extending member to support said boat or similar device, an axle extending between said support frames at a location spaced from said longitudinally extending member and a wheel rotatably supported on said axle whereby upon placement of a boat or similar device upon said cradle said wheel supports said boat or similar device and permits movement thereof, said axle being received in a pair of brackets spaced along the longitudinal axis of said transporter, and each of said frames having a pair of terminal portions which are slidably received in respective sockets to secure said frame to said axle, said terminal portions being cranked out of the plane of said frame member whereby said frame is reversible on said bracket to enable said frames to be secured in either a mutually divergent position or a mutually converging position.

2. A transporter for a boat or similar device comprising a cradle having a pair or laterally spaced support frames each of which includes a longitudinally extending member to support said boat or similar device, an axle extending between said support frames at a location spaced from said longitudinally extending member and a wheel rotatably supported on said axle whereby upon placement of a boat or similar device upon said cradle said wheel supports said boat or similar device and permits movement thereof, each of said support frames including a first frame member fixed with respect to said axle and a second frame member connected to said axle by pivot means for pivotal movement about a longitudinal axis, said pivot means permitting pivotal movement of said second frame member with respect to said first frame member between an operative position in which said first and second frame members diverge and a collapsed position in which said first and second frame members lie adjacent one another, and a flexible inextensible strap extending between said first and second frame members to limit movement of said second, frame member beyond said operative position and to provide a support capable of conforming to the surface of a boat or similar device supported on said transporter.

3. A transporter according to claim 2 wherein said strap extends laterally between said frames to interconnect said frames.

4. A transporter according to claim 3 wherein said strap projects beyond said second frame member to provide a fastening strap to secure said boat to said transporter.

5. A transporter according to claim 4 wherein said strap is adjustably secured to said second frame member to permit adjustment of spacing between said first and second frame members in said operative position.

6. A transporter according to claim 5 wherein each of said frame members is of trapezoidal shape and one of its parallel sides trapesium is secured to said axle and the other of its parallel sides provides said longitudinally extending member.

7. A transporter according to claim 6 wherein a bracket extends around said one parallel side of each of said frame members and has a flange depending therefore to receive said axle and define said pivot means.

* * * * *